United States Patent
Barkur et al.

(10) Patent No.: US 12,147,223 B2
(45) Date of Patent: Nov. 19, 2024

(54) METHOD AND SYSTEM FOR MONITORING CONDITION OF DRIVES

(71) Applicant: ABB Schweiz AG, Baden (CH)

(72) Inventors: Raghavendra Barkur, Bangalore (IN); Jampana Veera Venkata Naga Bapiraju, Bangalore (IN)

(73) Assignee: ABB Schweiz AG, Baden (CH)

( * ) Notice: Subject to any disclaimer, the term of this patent is extended or adjusted under 35 U.S.C. 154(b) by 334 days.

(21) Appl. No.: 17/615,298

(22) PCT Filed: May 26, 2020

(86) PCT No.: PCT/IB2020/054952
§ 371 (c)(1),
(2) Date: Nov. 30, 2021

(87) PCT Pub. No.: WO2020/240403
PCT Pub. Date: Dec. 3, 2020

(65) Prior Publication Data
US 2022/0221849 A1 Jul. 14, 2022

(30) Foreign Application Priority Data
May 30, 2019 (IN) .............................. 201941021548

(51) Int. Cl.
G05B 23/02 (2006.01)
G06F 11/07 (2006.01)

(52) U.S. Cl.
CPC ...... *G05B 23/0243* (2013.01); *G06F 11/0706* (2013.01); *G05B 2219/23446* (2013.01)

(58) Field of Classification Search
CPC ...... G05B 23/0243; G05B 2219/23446; G06F 11/0706
See application file for complete search history.

(56) References Cited

U.S. PATENT DOCUMENTS

| 9,939,795 B2* | 4/2018 | Anderson | G05B 23/0205 |
| 2010/0039120 A1* | 2/2010 | Plude | G05B 17/02 324/555 |

(Continued)

FOREIGN PATENT DOCUMENTS

| CN | 103020401 A | 4/2013 |
| CN | 104635715 A | 5/2015 |

(Continued)

OTHER PUBLICATIONS

Benigni et al., "Advancements and challenges of a multi-platform real time simulation lab for power applications," *IECON 2013-39th Annual Conference of the IEEE Industrial Electronics Society*, IEEE, 5358-5363 (Nov. 10-13, 2013).

(Continued)

*Primary Examiner* — Mong-Shune Chung
(74) *Attorney, Agent, or Firm* — Leydig, Voit & Mayer, Ltd.

(57) ABSTRACT

A method and system for monitoring condition of one or more industrial drives includes, in an embodiment, one or more industrial drives associated with a server. The server receives data associated with the one or more industrial drives and transmits the data to a HiL system associated with the server. The server configures the HiL system to generate one or more models replicating the one or more industrial drives and associated components. Upon configuring, the one or more industrial drives are tested, and a result of testing is provided to the site. The result of testing is compared with field data of the industrial drives to determine and monitor a condition of the industrial drives.

13 Claims, 6 Drawing Sheets

(56) References Cited

U.S. PATENT DOCUMENTS

| | | | |
|---|---|---|---|
| 2015/0277406 A1* | 10/2015 | Maturana | G06F 9/451 700/83 |
| 2016/0065652 A1* | 3/2016 | Davis | H02P 29/0241 709/217 |
| 2017/0212509 A1 | 7/2017 | Juhász et al. | |
| 2018/0129176 A1* | 5/2018 | Chi | G05B 23/0216 |
| 2019/0146434 A1* | 5/2019 | Fast | G05B 19/042 700/37 |
| 2019/0221317 A1 | 7/2019 | Kempanna et al. | |
| 2019/0311815 A1 | 10/2019 | Kim et al. | |
| 2020/0294531 A1 | 9/2020 | Shallom | |

FOREIGN PATENT DOCUMENTS

| | | | |
|---|---|---|---|
| CN | 106814638 A | 6/2017 | |
| CN | 106986246 A | 7/2017 | |
| CN | 107340441 A | 11/2017 | |
| CN | 107544456 A | 1/2018 | |
| CN | 107783529 A | 3/2018 | |
| CN | 109792227 A | 5/2019 | |

OTHER PUBLICATIONS

Dufour et al., "On the use of real-time simulation technology in smart grid research and development," *IEEE Transactions on Industry Applications*, 50(6): 2982-2989 (Apr. 3, 2014).

Dufour et al., "Review of state-of-the-art solver solutions for HIL simulation of power systems, power electronic and motor drives," *2013 15th European Conference on Power Electronics and Applications (EPE)*, IEEE, 12 pp. (Sep. 3-5, 2013).

Mohanty et al., "Literature survey on OPAL-RT Technologies with Advance features and Industrial applications," *2018 1st International Conference on Advanced Research in Engineering Sciences (ARES)*, IEEE, 5 pp. (Jun. 15, 2018).

Nowak et al., "Cloud-based DERMS Test Platform Using Real-time Power System Simulation," 2018 *IEEE Power & Energy Society General Meeting (PESGM)*, IEEE, abstract, 1 p. (Aug. 5-10, 2018).

European Patent Office, International Search Report in International Patent Application No. PCT/IB2020/054952, 3 pp. (Aug. 7, 2020).

European Patent Office, Written Opinion in International Patent Application No. PCT/IB2020/054952, 7 pp. (Aug. 7, 2020).

Intellectual Property India, First Examination Report in Indian Patent Application No. 201941021548, 6 pp. (Mar. 18, 2021).

Israel Patent Office, International Search Report in International Patent Application No. PCT/IB2020/054952, 4 pp. (Sep. 19, 2021).

Israel Patent Office, Written Opinion in International Patent Application No. PCT/IB2020/054952, 5 pp. (Sep. 19, 2021).

European Patent Office, Office Action in European Patent Application No. 20729216.0, 9 pp. (Aug. 28, 2023).

The Patent Office of the People's Republic of China, Office Action in Chinese Patent Application No. 202080040053.X, 11 pp. (Oct. 25, 2023).

* cited by examiner

METHOD AND SYSTEM FOR MONITORING CONDITION OF DRIVES

CROSS-REFERENCE TO RELATED APPLICATIONS

This patent application is a U.S. national phase patent application of International Patent Application No. PCT/IB2020/054952, filed May 26, 2020, which claims priority from Indian Patent Application No. 201941021548, filed May 30, 2019, each of which is fully incorporated herein by reference for all purposes.

TECHNICAL FIELD

The current invention relates in general to monitoring condition of drives and more particularly to detect and monitor condition of drives located at a site remotely using a cloud server.

BACKGROUND

Industrial sites such as power generating units, substations, oil refineries etc., use complex industrial equipment which includes a plurality of components. The components of the system, for instance electric drives, motors etc., work as integrated part of the system and are typically directly or indirectly interdependent on other components of the system for their function. Often, there might be faults or errors occurring in such systems that can lead to failure of critical equipment or/and processes.

Root-Cause Analysis (RCA) is a set of processes or methods applied for identification of primary cause of a failure in a system or subsystem. A large number of algorithms and techniques to perform root-cause analysis have been developed and are widely in use. The RCA can help in identifying fundamental reasons for equipment failure and may recommend corrective measures for overcoming equipment failure thereby preventing recurrence of the fault.

Hardware-in-the-loop (HiL) testing can also be used for resolving equipment failure using RCA of equipment and process failures. HiL testing is used to identify root cause of failures and prevent them from recurring. HiL testing facilitates systematic testing of devices and equipment under a wide range of real-time use scenarios.

Often it is desirable to test the performance of equipment before deploying them in the field or site. Additionally, there could be faults and errors that could develop over the lifecycle of the equipment. To test the equipment or perform RCA, a HiL simulator may be setup. For example, an equipment or device under test can be a drive control hardware. Components associated with the device under test (motor connected to the drive, a load connected to the motor, sensors mounted on motor) are simulated either with replica-hardware or with real-time simulators. The simulated sensors, the simulated motor, and the simulated loads are representative of the equipment or site models. These models respond and interact with the drive control hardware to simulate real world events in real time. The real-time simulators provide an accurate representation of the environment characteristics and signals that the device under test typically encounters. This enables an accurate test or root-cause analysis of the system under diagnosis.

Generally, many industrial sites are not equipped with HiL testing simulation platforms and may also lack proper measurements around the issue at site. Furthermore, customers may not allow access to test results unless the root cause is analyzed. A service engineer, therefore, has to wait for solution from root-cause analysis from support team in the site. An on-site expert can be unreliable since the scale and system complexity is typically too large for a root-cause analysis to be unbiased and accurate.

Thus, there exists a need to provide new and improved systems and methods that will facilitate remote root-cause analysis through real-time simulation of equipment and its environment with reduced additional hardware and software demands from the customer.

SUMMARY OF THE INVENTION

In an embodiment, the present invention relates to a method and a system for monitoring condition of one or more industrial drives. The one or more industrial drives can be configured in a same site or can be configured in different sites. Each industrial drive is associated with a computing unit. The computing unit can be used for controlling the corresponding industrial drive, obtain field data and analyse the field data for determining and monitoring condition of the industrial drive. In an embodiment, the one or more industrial drives can be associated with a server, via the computing unit. The server receives operational data, configuration data and test data associated with the one or more industrial drives and transmits the received data to a Hardware in the Loop (HIL) system associated with the server. In an embodiment, the server configures the HiL system to generate one or more models replicating the one or more industrial drives and components associated with the one or more drives. The one or more models are generated to work similar to the one or more industrial drives and the components associated with the one or more industrial drives. The server configures the HiL system by selecting an appropriate firmware and test suites for testing the one or more industrial drives. Upon configuring the HiL system, the one or more industrial drives are tested, and a result of testing is retrieved by the server from the HiL system and provide the result of testing to the computing system associated with corresponding industrial drives. The result of testing can be compared with field data of the industrial drives to determine and monitor a condition of the industrial drives.

In an embodiment, the operational data and configuration data can be used to set up the HiL system and the test data can be used to configure the HiL system to replicate one or more conditions of the site for testing the one or more industrial drives in the one or more conditions.

In an embodiment, the test results from the HiL system and the filed data are compared to identify a root cause of a fault or a condition of the one or more industrial drives. In a further embodiment, the root cause can be addressed by monitoring the one or more drives or by scheduling maintenance timely.

Systems of varying scope are described herein. In addition to the aspects and advantages described in this summary, further aspects and advantages will become apparent by reference to the drawings and with reference to the detailed description that follows.

BRIEF DESCRIPTION OF THE DRAWINGS

The subject matter of the invention will be explained in more detail in the following text with reference to preferred exemplary embodiments which are illustrated in the drawings, in which.

DETAILED DESCRIPTION

The present invention discloses a method and a system for determining and monitoring condition of industrial drives configured in a site/field.

Figure 1:
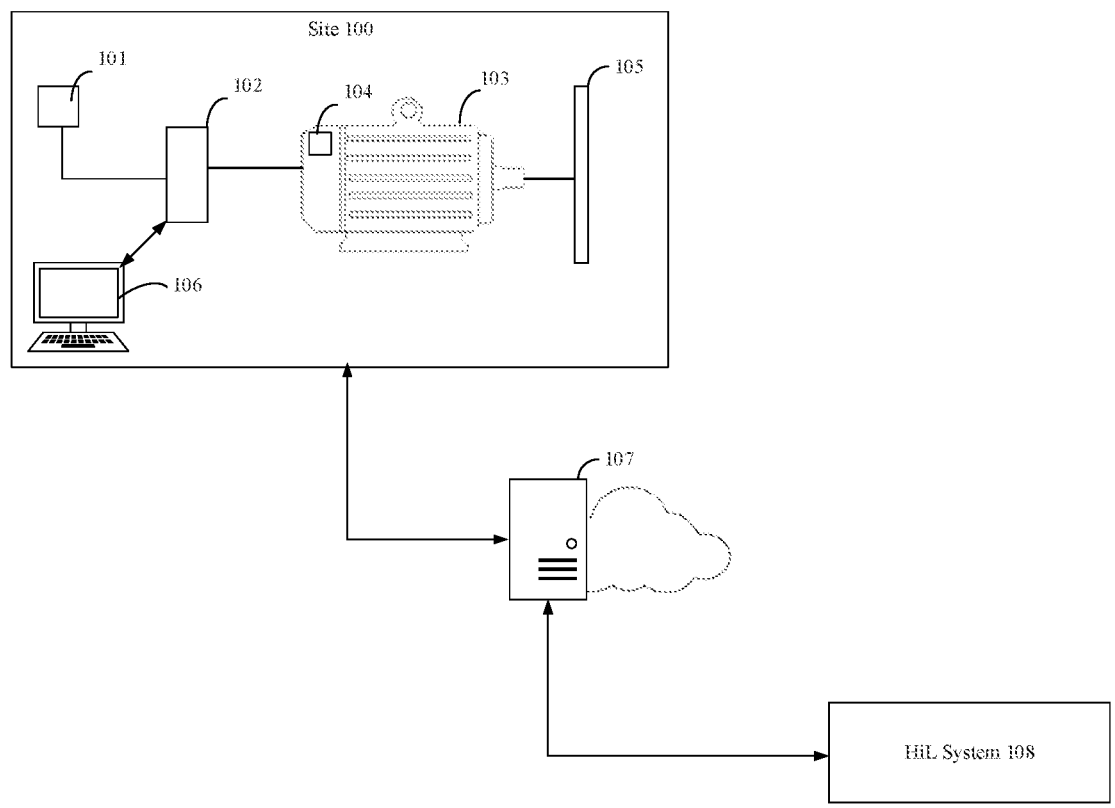
FIG. 1 illustrates a simplified block diagram of an environment for remotely monitoring condition of industrial drives, in accordance with an embodiment of the present disclosure.

FIG. 1 illustrates a simplified block diagram of an environment for remotely monitoring condition of industrial drives. As shown in FIG. 1, a site (100) or field (for example an industrial plant) comprises one or more systems for operating and controlling site equipment. The site equipment can include an industrial drive (102), a motor (103), load (105) connected to the motor (103), sensors (104) integrated to monitor the site equipment, and a plurality of components (not shown). Henceforth in the present disclosure, the term "drive" is used while making reference to a single industrial drive and the term "one or more drives" is used while making reference to a either a single industrial drive or a plurality of industrial drives. Typically, the industrial drive (102) (also referred as drive) is electrically connected to the motor (103) for controlling speed and torque of the motor (103), in turn controlling speed and torque of the load (105). The drive (102) is connected to a power supply (101). The motor can also be connected to the power supply (101), however, the electrical connection is not shown in FIG. 1 and a person of ordinary skill should appreciate such connection exits. In one embodiment, the sensors (104) are mounted on the motor (103). In another embodiment, the sensors (104) can be mounted on the drive (102). The sensors (104) can be configured to measure various parameters such as vibrations, temperature, speed, current, voltage, and the like.

In an embodiment, the drive (102) is connected to a computing unit (106). The computing unit (106) can be an electronic device such as a desktop, a laptop, a tablet, a Personal Digital Assistant (PDA), and the like. The computing unit (106) is configured to operate and control the drive (102). Field data such as data received from the sensors (104), historical data associated with the drive (102), historical data associated with the motor (103), fault trends, are stored in the computing unit (106) or a database (not shown) associated with the computing unit (106). In an embodiment, the computing unit (106) can be used for analyzing the field data for detecting and monitoring condition of the drive (102). The condition of the drive (102) is determined and monitored to identify faults and root cause of such faults in the drive (102).

In an embodiment, the Hardware in the Loop (HiL) system (108) is configured to test a control hardware (for example, drive (102)) by simulating the site (100) environment. Typically, testing the control hardware such as the drive (102) in various site (100) conditions (for example, different operating temperature, various speed and torque for varying load) is not feasible. Equipment like motors are expensive and testing the control hardware to control the equipment can lead to damage to the equipment. Hence, HiL system (108) is used to simulate the site (100) conditions and test the control hardware. In one embodiment, the control hardware can be directly used or a replica hardware such as a Proportional Integral Derivative (PID) controller is used in place of the control hardware. The replica hardware can comprise a firmware similar to a firmware of the control hardware to replicate the functions of the control hardware. In an embodiment, the simulated equipment is communicatively coupled with the replica hardware. In an embodiment, the HiL system (108) replicates the site (100) conditions such that the replica hardware receives signals/information from the simulated equipment similar to the signals/information generated by the equipment in site (100). Thus, testing the replica hardware replicating the control hardware in various site (100) conditions can be useful to monitor condition of the control hardware and identify faults associated with the control hardware or associated equipment. Generally, the site hosting the control hardware comprises the HiL system (108) to test the control hardware.

In an embodiment, the HiL system (108) has to be set up and configured to replicate the site (100) conditions. For replicating the site (100) conditions, data related to the control hardware is necessary. In one embodiment, the server (107) facilitates to set up and configure the HiL system (108). The server (107) receives operational data, configuration data and test data associated with the drive (102) installed in the site (100). In an embodiment, the server (107) may be a cloud-based server. In an embodiment, the server (107) can provide remote services to monitor and determine condition of the drive (102). The server (107) can provide services to set up and configure the HiL system (108) at a remote location. Therefore, each site (100) may not comprise the HiL system (108). In case of a plurality of sites (100) hosting one or more drives, each site (100) can connect to the server (107) for receiving services related to determining and monitoring condition of the one or more drives. In an embodiment, the server (107) can prioritize the site (100) and the one or more drives of respective site (100) based on inputs from site engineers in the respective site (100) or based on one or more condition associated with the one or more drives.

Figure 2:
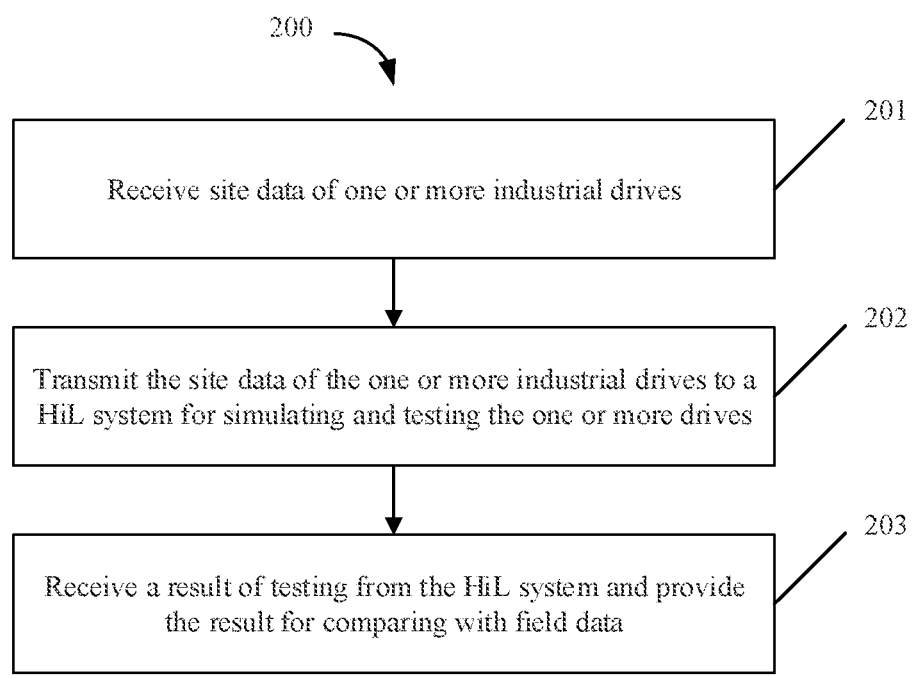
FIG. 2 illustrates an exemplary flow chart for remotely monitoring condition of industrial drives, in accordance with an embodiment of the present disclosure.

FIG. 2 illustrates an exemplary flow chart for remotely monitoring condition of one or more industrial drives (102).

At step 201, the server receives data associated with the one or more drives. In an embodiment, the data can include operational data, configuration data and test data. In an embodiment, the operational data can include at least one of load torque, motor speed, supply voltage, ambient conditions measured using the sensors (104). In an embodiment, the load torque may be estimated using current measured in the one or more drive (102). In an embodiment, the ambient conditions can include temperature, pressure, humidity, etc. In an embodiment, the configuration data can include at least one of nominal ratings of the one or more drives and the associated components (e.g., motor (103, sensors (104)) and firmware associated with the one or more drives. In an embodiment, the test data can include but is not limited to test suites and a fault trend in the one or more drives. The test suites comprise a plurality of test cases for testing the one or more drives in one or more conditions. In an embodiment, one or more test cases can be selected among the plurality of test cases based on the condition to be tested and a severity of the site (100) condition. For example, consider that ten test cases are predefined for testing a drive (102). In an overheating condition, two specific test cases need to be executed to identify root cause of overheating of the drive (102). In such scenarios, a site engineer can select specific test cases in the UI for the HiL system (108) to execute the selected test cases.

Figure 3:
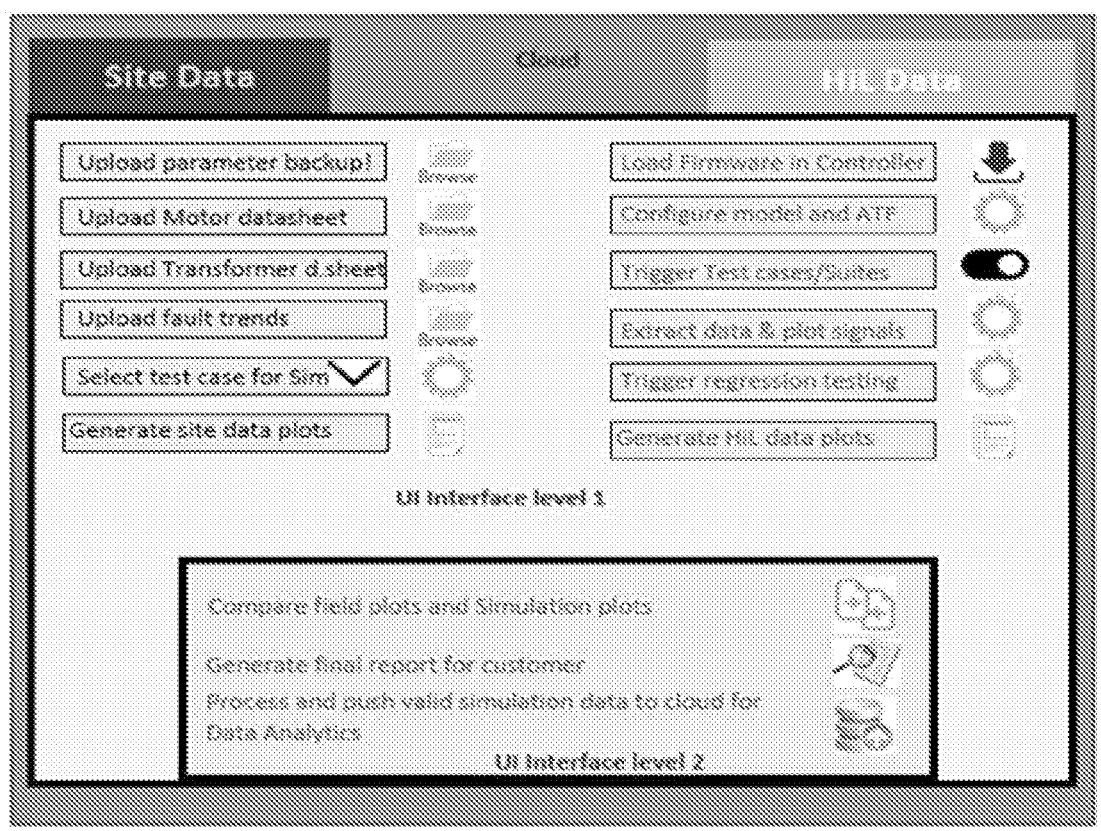
FIG. 3 illustrates an exemplary UI for receiving industrial drive parameters for setting up and configuring HiL system, in accordance with an embodiment of the present disclosure.

In an embodiment, the server (107) may implement an application on the computing unit (106) associated with the corresponding one or more drives. The application is executed on the computing unit (106) to receive the operational data, the configuration data and the test data from the site (100). In an embodiment, the application can provide a User Interface (UI). FIG. 3 illustrates an exemplary UI for receiving drive parameters for setting up and configuring HiL system. In an illustrative aspect of FIG. 3, a first level of the UI may comprise a plurality of input fields for receiving the operational data, the configuration data and the test data. As shown in FIG. 3, the input fields may provision the site engineer to upload operational data and configuration data such as motor (103) datasheet, drive (102) datasheet, and fault trends associated with the drive (102). In an embodiment, the application can be implemented in each computing unit (106) associated corresponding drive.

In an embodiment, the UI may also provision the site engineer to input data related to the HiL system (108), such as firmware associated with the one or more drives, one or more models for simulating the associated equipment and the one or more drives, generating plots upon testing, etc.

Figure 4:
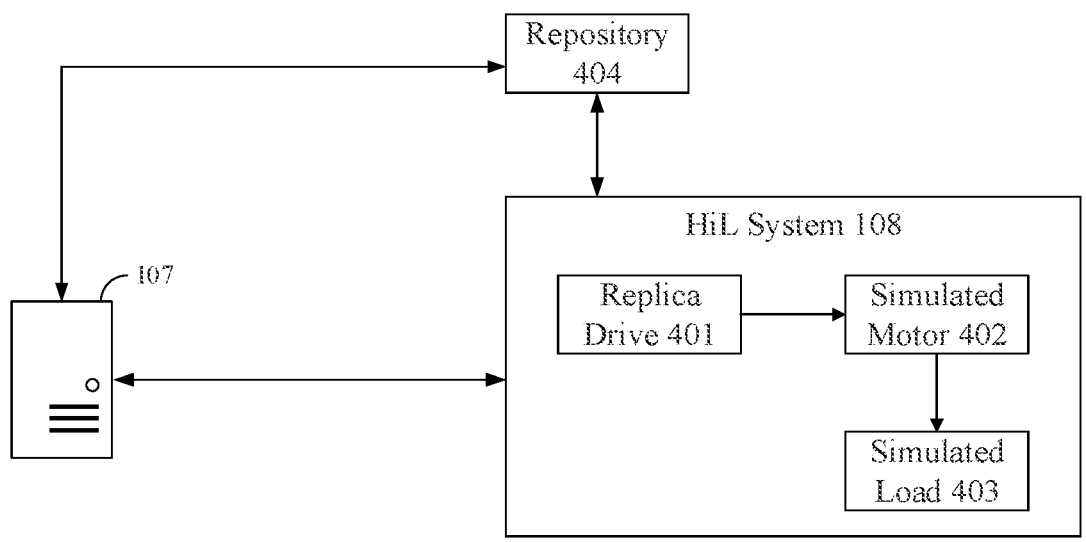
FIG. 4 illustrates exemplary scenario of setting up and configuring a HiL system, in accordance with an embodiment of the present disclosure.

At step 202, the server (107) transmits the received data to the HiL system (108) for simulating and testing the one or more drives. In an embodiment, the server (107) transmits the received data to the HiL system (108) for setting up and configuring the HiL system (108) to replicate the site (100) condition. FIG. 4 illustrates exemplary scenario of setting up and configuring a HiL system, in accordance with an embodiment of the present disclosure. In an illustrative example of FIG. 4, the server (107) is communicatively coupled with the HiL system (108). The HiL system (108) can also be associated with a repository (404). The repository (404) can store a plurality of firmware associated with a plurality of equipment. For example, the repository (404) may store a plurality of versions of firmware of a drive, namely, drive1_firmware_v1.0, drive1_firmware_v1.1, drive1_firmware_v2.0, drive2_firmware_v2.0, drive2_firmware_v2.1, etc. A continuous integration platform such as Jenkins Automation Server (JAS) may act as the repository (404). In an embodiment, the JAS may comprise control software of the one or more drives. Likewise, the JAS may comprise control software of a plurality of equipment.

The repository (404) may also comprise a plurality of test cases for testing a plurality of equipment. Examples of test cases may include operating a drive under high pressure, operating a motor under very high vibration, operating a drive for variable load torque, operating a drive for constant load torque, etc. In an embodiment, frameworks like Automated Test Frameworks (ATF) can be used to automate the generation of test cases. The ATF can be hosted on the server (107) or in the HiL system (108) or at a customer premise.

In an embodiment, the server (107) can set up the HiL system (108) by selecting a firmware from the plurality of firmware for a drive (102) selected by the site engineer. In an embodiment, the selected firmware is used by the replica hardware (referred as replica drive in FIG. 4) (401) to operate as the drive (102) present in the site (100). In one embodiment, the server (107) can retrieve the selected firmware from the repository (404) and provide the selected firmware to the HiL system (108). In another embodiment, the server (107) can indicate the HiL system (108) about the selected firmware and the HiL system (108) can retrieve the selected firmware from the repository (404). Further, the server (107) can select one or more models for simulating the motor (103) and the load (105). The operational data and the configuration data of the selected drive (102) are used for generating the replica drive (401), the simulated motor (402) and the simulated load (403). In an embodiment, a real-time simulator can be used to generate the replica drive (401), the simulated motor (402) and the simulated load (403). In an embodiment, the PID controller is used as the replica drive (401). In an embodiment, emulated signals are generated, similar to real signals associated with the drive (102) installed in the site (100). The emulated signals may be provided to the simulated motor (402) or the emulated signals may be provided to the replica drive (401). In an embodiment, the communication between the replica drive (401) and the simulated motor (402) are modelled to replicate behavior of the selected drive (102) and the motor (103) installed in the site (100). The presence of the emulated signals creates an environment which is similar to the site conditions.

In an embodiment, when the HiL system (108) is set up and configured, the plurality of test cases is executed by the HiL system (108) to test the selected drive (102). Further, result of testing is received by the server (107). The server (107) provides the result of testing to the computing unit (106) via the application provided in the computing unit (106). In an embodiment, the result of testing can be compared with field data to identify root cause of faults in the selected drives (102). The result of the testing can comprise a diagnosis report. In an embodiment, the server (107) can receive a request from one or more drives for generating simulation results for the one or more drives. In such scenarios, the server (107) can configure the HiL system (108) for the one or more drives respectively based on a priority/severity/a condition associated with the one or more drives (1020 or with corresponding site (100). In one embodiment, the site engineer can provide a priority value to the one or more drives to be simulated.

Figure 5:
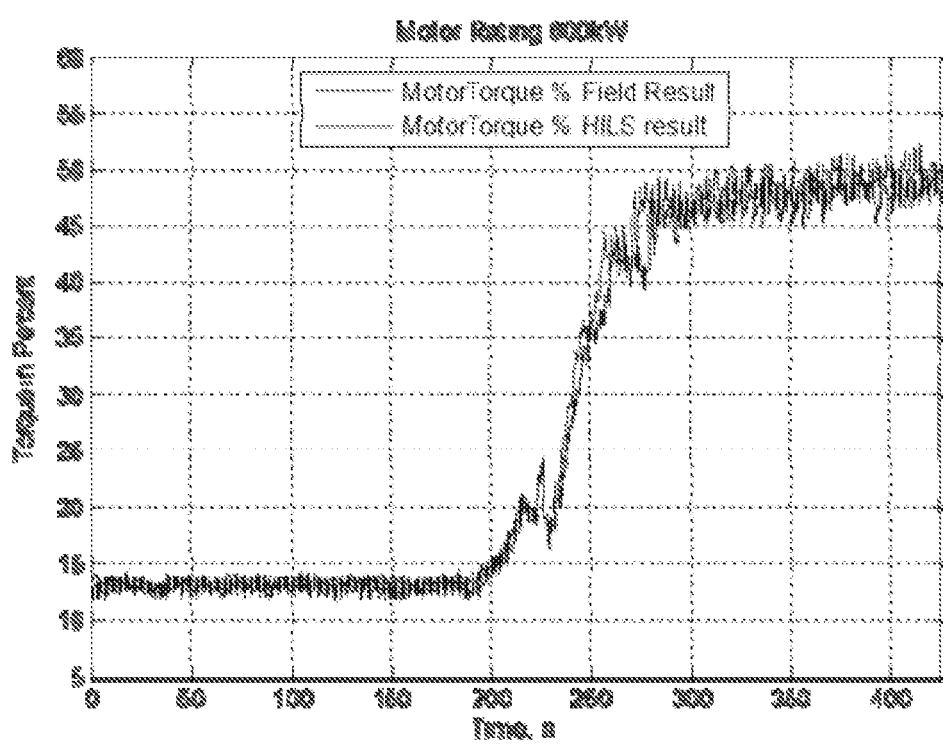
FIG. 5 and FIG. 6 illustrate exemplary plots provided by the server for comparing with filed data to determine and monitor condition of industrial drives, in accordance with an embodiment of the present disclosure.
Figure 6:
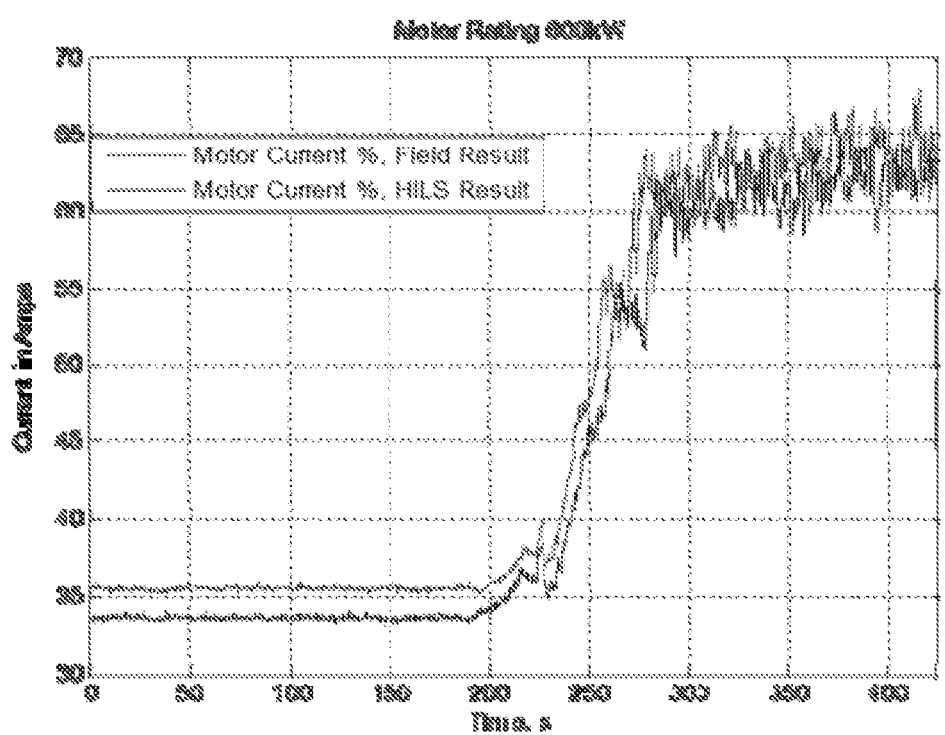

FIG. 5 and FIG. 6 illustrate exemplary plots provided by the server for comparing with filed data to determine and monitor condition of industrial drives. In an embodiment, the site engineer may compare the plots received from the testing with plots generated using field data. A comparison between the field plot and the simulation plot can lead to identifying root-cause of failure. The site engineer can analyze and compare the field data with HiL results for root-cause analysis of the fault. An example of such data comparison is shown in FIGS. 5 and 6. FIG. 5 shows a comparison of torque variation in a motor. The field results of the motor torque data are well replicated by the HiL simulation results for a similarly configured simulated motor. FIG. 6 shows the current (in Amperes) drawn by the real on-site motor and the simulated motor as a function of time. The current in HiL motor before 200 sec shows lesser current for same speed and torque (FIG. 6). The root cause analysis suggested the most probable cause as supply undervoltage. The site engineer can take appropriate actions by changing the drive setting to correct the parameter of the motor in the field thereby reducing the difference in current drawn.

In an embodiment, the server (107) may comprise Artificial Intelligence (AI) techniques to automatically detect a new request and select test data, and configuration data based on historical analysis of the condition associated with the one or more drives.

REFERRAL NUMERALS

100—Site
101—Power supply
102—Drive
103—Motor
104—Sensors
105—Load
106—Computing unit
107—Server
108—HiL system
401—Replica drive
402—Simulated motor
403—Simulated load
404—Repository

We claim:

1. A method for monitoring condition of one or more industrial drives, wherein each industrial drive is configured to control a motor connected to a load, wherein a computing unit associated with each industrial drive is configured to store field data related of the industrial drive, the motor and the load, wherein the method is performed by a server connected with the one or more industrial drives over a communication network, the method comprising:
   receiving site data of one or more industrial drives from the computing unit associated with each industrial drive, the site data comprising:
   operational data of the one or more industrial drives, wherein the operational data comprises at least one of a load torque, supply voltage and ambient conditions for operating the one or more industrial drives;
   configuration data of the one or more industrial drives, wherein the configuration data comprises at least nominal ratings of operating the one or more industrial drives and a firmware associated with the one or more industrial drives; test data for testing the one or more industrial drives in one or more conditions, wherein the test data comprises at least a fault trend in the one or more industrial drives and test suites for testing the one or more industrial drive in the one or more conditions;
   transmitting the site data to a Hardware in the Loop (HIL) system for generating one or more models to replicate the one or more industrial drives and configuring the one or more models to operate similar to the one or more industrial drives using the operational data and the configuration data of the one or more industrial drives, wherein the test data is used to emulate the one or more conditions for testing the one or more industrial drive in the HIL system; and
   receiving a result of testing the one or more industrial drives, wherein the result of testing the one or more industrial drives is provided to corresponding computing unit, wherein the result of testing is compared with the field data of the one or more industrial drives for determining and monitoring a condition of the one or more industrial drives.

2. The method as recited in claim 1, wherein the one or more industrial drives are located at one or more sites.

3. The method as recited in claim 2, wherein the one or more models of the one or more industrial drives are prioritized based on at least one of a condition associated with the one or more industrial drives and a condition associated with the one or more sites.

4. The method as recited in claim 1, wherein the ambient condition comprises at least one of pressure, temperature and humidity.

5. The method as recited in claim 1, wherein the configuration data of the one or more industrial drives are obtained from one of a datasheet associated with the one or more industrial drives or the server.

6. The method as recited in claim 1, wherein the server facilitates in configuring the HIL system, by:
   selecting one or more test cases from the test suites of the one or more industrial drives, wherein the selected one or more test cases provided to the one or more models for replicating the one or more conditions of the one or more sites for determining a condition of the one or more industrial drives.

7. The method as recited in claim 1, wherein the determined condition of the one or more industrial drives is used for identifying a root cause of operating the one or more industrial drives in the condition.

8. A server for monitoring condition of one or more industrial drives, wherein each industrial drive is configured to control a motor connected to a load, wherein a computing unit associated with each industrial drive is configured to store field data related of the industrial drive, the motor and the load, wherein the server is connected with the one or more industrial drives over a communication network, the server comprising:
   one or more processors associated with a database, wherein the one or more processors are configured to:
   receive site data of one or more industrial drives from the computing unit associated with each industrial drive, the site data comprising:
   operational data of the one or more industrial drives, wherein the operational data comprises at least one of a load torque, supply voltage and ambient conditions for operating the one or more industrial drives;
   configuration data of the one or more industrial drives, wherein the configuration data comprises at least nominal ratings of operating the one or more industrial drives and a firmware associated with the one or more industrial drives;
   test data for testing the one or more industrial drives in one or more conditions, wherein the test data comprises at least a fault trend in the one or more industrial drives and test suites for testing the one or more industrial drive in the one or more conditions; transmit the site data to a Hardware in the Loop (HIL) system for generating one or more models to replicate the one or more industrial drives and configuring the one or more models to operate similar to the one or more industrial drives using the operational data and the configuration data of the one or more industrial drives, wherein the test data is used to emulate the one or more conditions for testing the one or more industrial drive in the HIL system; and
   receive a result of testing the one or more industrial drives, wherein the result of testing the one or more industrial drives is provided to corresponding computing unit, wherein a display associated with the computing unit is configured to display a comparison of the result of testing with the field data of the industrial drive for determining and monitoring a condition of the industrial drive.

9. The server as recited in claim 8, wherein the one or more processors receives the site data from the one or more industrial drives located at one or more sites.

10. The server as recited in claim 9, wherein the one or more processors prioritize the one or more models of the one or more industrial drives based on at least one of a condition associated with the one or more industrial drives and a condition associated with the one or more sites.

11. The server as recited in claim 8, wherein the one or more processors obtains the configuration data of the one or more industrial drives from one of a datasheet associated with the one or more industrial drives or the server.

12. The server as claimed in claim 8, wherein the one or more processors facilitate in configuring the HIL system, by:
   selecting one or more test cases from the test suites of the one or more industrial drives, wherein the selected one or more test cases provided to the one or more models for replicating the one or more conditions of the one or more sites.

13. The server as recited in claim 8, wherein the one or more processors are configured to display the received result of testing and the filed data on the display, wherein a site engineer compares the result of testing and the filed data to identify a root cause of operating the one or more industrial drives in the determined condition.

\* \* \* \* \*